United States Patent
Nicholson et al.

[11] Patent Number: 6,000,420
[45] Date of Patent: Dec. 14, 1999

[54] INSULATING JACKET FOR HOT AND COLD PIPING SYSTEMS AND METHOD OF USE

[75] Inventors: Robert Kent Nicholson, Phoenix; James Lannen Beckstrom, Parkton; Norman George Somerville, Columbia, all of Md.

[73] Assignee: Horizon Resources Corporation, Hunt Valley, Md.

[21] Appl. No.: 09/116,206

[22] Filed: Jul. 16, 1998

Related U.S. Application Data

[63] Continuation-in-part of application No. 08/468,845, Jun. 6, 1995, Pat. No. 5,797,415.

[51] Int. Cl.⁶ .................................................... F16L 7/00
[52] U.S. Cl. ............................ 137/15; 137/375; 137/559; 138/47; 138/149
[58] Field of Search ............................ 137/15, 375, 559; 138/47, 149

[56] References Cited

U.S. PATENT DOCUMENTS

| | | |
|---|---|---|
| 1,383,680 | 7/1921 | Waldorf . |
| 1,910,703 | 5/1933 | Le Grand . |
| 2,078,606 | 4/1937 | Le Grand . |
| 2,613,166 | 10/1952 | Gronmeyer . |
| 2,841,203 | 7/1958 | Gronmeyer . |
| 2,980,568 | 4/1961 | Kazmierowicz . |
| 3,425,456 | 2/1969 | Schibig . |
| 3,495,629 | 2/1970 | Botsolas . |
| 3,572,395 | 3/1971 | Burns . |
| 3,732,894 | 5/1973 | Botsolas . |
| 3,904,379 | 9/1975 | Oser et al. . |
| 3,981,689 | 9/1976 | Trelease . |
| 4,696,324 | 9/1987 | Petronko ................................. 137/375 |
| 4,830,060 | 5/1989 | Botsolas ................................. 137/375 |
| 5,025,836 | 6/1991 | Botsolas . |
| 5,158,114 | 10/1992 | Botsolas . |
| 5,505,500 | 4/1996 | Webb et al. ............................ 137/375 |

*Primary Examiner*—A. Michael Chambers
*Attorney, Agent, or Firm*—Albert W. Davis, Jr.

[57] ABSTRACT

An insulating jacket, that is removable and reusable, for insulating a hot or cold fluid distribution system is described. The jacket is made of a plurality of sections which mate and seal together to effectively seal the pipe section and/or fitting from the surrounding ambient atmosphere. Each of the jacket sections can be made of a clear thermoplastic material and the entire assembly is designed to employ the trapped air, between the inside wall of the jacket and the system element, as the insulator. Plural jackets are used to form plural radially spaced trapped air gaps.

17 Claims, 8 Drawing Sheets

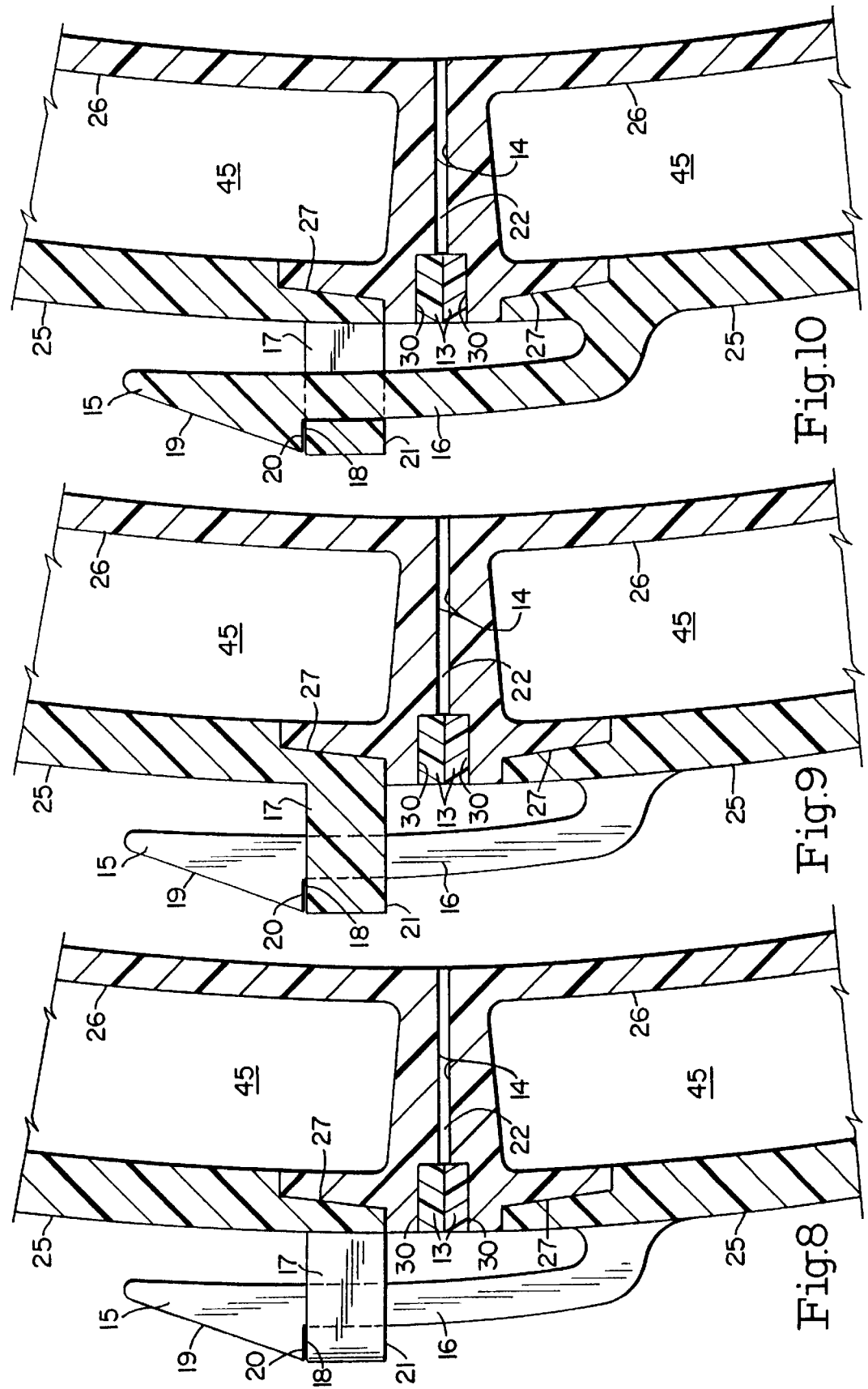

INSULATING JACKET FOR HOT AND COLD PIPING SYSTEMS AND METHOD OF USE

This application is a continuation-in-part of Ser. No. 08/468,845 filed on Jun. 6, 1995 now U.S. Pat. No. 5,797,415. That application described a similar invention for use on any element of a hot or cold fluid piping system, but more specifically, on a valve in a chilled fluid piping system. This application is an extension of the technology described in the above referenced application. Pipe fittings shall include, but not be limited to, 90 degree elbows, 45 degree elbows, tees, wyes, unions, reducers, caps, cleanouts, traps, strainers, pressure reducers, actuators, flanges, flow restrictors, metering devices and any other elements.

The disclosure of patent application Ser. No. 08/468,845 to Nicholson et al for an Insulating Jacket For Hot and Cold Piping Systems and the Method of Use is hereby incorporated by reference into this application.

BACKGROUND OF THE INVENTION

The herein disclosed invention is that of a multi-piece plastic removable and reusable insulation jacket for insulating elbows and pipe sections in a chilled fluid piping system. More generally, this invention relates to an insulation cover for insulating any component in a fluid piping system including, but not limited to, valves, fittings and pipes for temperatures of both below and above ambient.

A significant void exists in the availability of effective insulation for pipes, valves and fittings for low (sub-ambient) temperature fluids. Currently, the most common and effective insulation applications for pipes, valves and fittings are for high (above ambient) temperature fluids. Differential temperatures in the majority of low temperature installations are on the order of 100 F. or less, compared to high temperature installations where differentials exceeding 1000 F. are not uncommon, with the majority of these installations having differentials between 200 F. and 700 F. One can easily recognize the cost savings that will accrue from insulating high temperature piping systems, while the actual cost savings of effectively insulating low temperature piping systems is not so obvious, because the comparatively small temperature differentials between a cold piping surface and a warmer and moist environment is misleading in that, unlike high temperature piping installations, the ambient humidity becomes a dominant factor.

In high temperature piping applications, ambient humidity is and remains in the vapor state, while in low temperature piping applications the ambient humidity or water vapor tends to condense or change state from a vapor to a liquid or solid on the low temperature piping system surface. As heat is withdrawn from the ambient environment through heat gain by the cooler low temperature piping system, ambient water vapor molecules lose energy and concentrate in the boundary layer of the piping system surface. As ambient air near the piping system surface reaches its dewpoint, moisture begins to condense or freeze on the piping system surface and then cools to the surface temperature of the piping system. This change of state or phase for water is the result of the heat transfer to the chilled circulating fluid in the piping system due to the water vapor's latent heat of vaporization, which typically doubles the apparent heat gain from the ambient temperature change alone. Thus the value of effective low temperature insulation is double, on a thermal gain basis alone, what is typically perceived from only the temperature differential. Therefore, if an insulation system on low temperature piping systems is to be effective, the insulation system must economically isolate the piping system from the ambient moisture laden environment. Another reason isolation is so important is because as insulation becomes wet with condensation the wet insulation loses its thermal resistance and the effectiveness of the insulation is diminished. Also, as ambient water vapor condenses on a chilled water piping system due to the insulation not totally isolating the piping system, a vapor pressure differential is developed between the inside and outside of the insulation. This vapor pressure differential is the force that causes the vapor migration to continue into the pipe insulation. Therefore, effective low temperature pipe insulation must not only provide thermal resistance, but also water vapor isolation and impermeability.

Today, low temperature or chilled water piping systems are insulated primarily for one or more of the following reasons:

1. Conservation of energy.
2. Control and prevention of condensation.
3. Optimization of equipment sizing.
4. Process control.

By controlling and preventing condensation, designers also eliminate or minimize four problems commonly associated with chilled water insulation systems:

1. Dripping pipes that damage ceilings, walls, floors, equipment and/or furnishings.
2. Initiation of mold and mildew and the potential for associated health problems.
3. Corrosion of pipes, valves and fittings promoted by water condensation and/or chemicals leached by the moisture passing through the insulation itself.
4. Heat gained from no or failed insulation.

Due to the above problems, the importance of effectively insulating chilled water systems can not be understated.

Recent surveys have revealed that chilled water distribution systems have a high incidence of failure, as stated in an article entitled "Insulating Chilled Water Systems" in Insulation Outlook magazine, May, 1993. Failures occur even though many insulated chilled water distribution systems are typically indoors or in protected areas not subject to physical abuse or weather. The cause of failure is due to moisture which permeates the insulation material itself as well as the minor imperfections at joints and fittings. This moisture penetration is caused by driving vapor pressure differences prevalent between the outside of the insulation and the cold pipe surface. The results of failure in chilled water systems are dripping water from the insulated surface, pipe and fitting corrosion, increased operating costs due to lost efficiency, and mold/mildew formation.

While dripping condensation may be easily recognizable, moisture vapor intrusion is generally not obvious and can progress for relatively long periods of time before any visible evidence is noticed. During this period, not only has the insulation lost its thermal resistance due to moisture, but also the pipe and pipe fittings have been rusting and corroding. Disregarding the cost of replacing corroded valves, pipe and fittings, the insulation must be replaced and experienced engineers have suggested that replacement costs of the insulation can easily run two to three times the initial installed insulation cost.

DESCRIPTION OF RELATED ART

As discussed above, insulated chilled water systems are subject to a high degree of failure, particularly at joints and fittings. In fact, recent studies have shown that minor imperfections at these points have permeance values five to ten times higher than those from other insulated pipe surfaces. Early efforts in the insulation of chilled water piping system fittings using methods and materials similar to those in high temperature piping systems were completely ineffective in that they failed to incorporate barriers to prevent the migration and condensation of ambient moisture. Subsequent methods incorporated the use of cementitious or mastic coatings to provide adequate vapor barriers which usually failed under even minor mechanical impact. Ultimately, metallic or plastic barriers were developed for use over insulation applied to the fitting surface.

Presently, the method most widely used by the industry to insulate elbows is to enclose the elbow with fiberglass insulation and then cover this insulation with a preformed plastic cover which overlaps the adjacent pipe insulation on both sides. This type of cover is described in U.S. Pat. No. 3,495,629 (Botsolas), U.S. Pat. No. 3,732,894 (Botsolas), U.S. Pat. No. 5,025,836 (Botsolas), U.S. Pat. No. 5,158,114 (Botsolas), U.S. Pat. No. 3,572,395 (Burns), U.S. Pat. No. 3,425,456 (Schibig) and U.S. Pat. No. 2,980,568 (Kazmicrowicz). With these types of covers the fiberglass insulation performs the insulating function while the plastic cover holds it in place and acts as a barrier against intrusion of moisture. Field sealing of seams and interfaces are usually carried out by the use of rivets, staples, adhesives or cements, tape or other post applied materials.

As noted above, the examples given of this type of elbow cover perform the main function of enclosing fiberglass insulation around the elbow. It is then sealed from the atmosphere using any of the above methods. The claimed insulating capability results from the heat insulating material (fiberglass).

Exceptions to this type of insulating jacket are described in U.S. Pat. No. 3,981,689 (Trelease), U.S. Pat. No. 3,904,379 (Oser et al), U.S. Pat. No. 2,841,203 (Gronmeyer), U.S. Pat. No. 2,613,166 (Gronmeyer), U.S. Pat. No. 2,078,606 (Le Grand), U.S. Pat. No. 1,910,703 (Le Grand) and U.S. Pat. No. 1,383,680 (Waldorf). These jackets use multiple which create spaces to effect thermal insulation. However, they are exclusively of metallic construction with a multiplicity of separate segments, spaces and fasteners which are very complex and expensive to fabricate and install. The inventions described in the Trelease and Oser patents are designed for use in high temperature applications only. The inventions described by the Gronmeyer and Le Grand patents are designed for both hot and cold applications and the method by which the exterior of the jackets are sealed to isolate the interior spaces from migrating moisture vapor to eliminate internal condensation in a low temperature piping system is set forth in a general way. Gronmeyer suggests caulk and tape. Waldorf's invention is similar but suggests the use of "telescopic joints" to join sections together and also the use of cement to seal these joints.

All of the above examples of prior art have one other common drawback as they may apply to chilled water insulation systems. Even if the cited inventions were capable of effectively isolating the piping system from the surrounding atmosphere and could be manufactured economically, all are fabricated from opaque materials which are used as outer casings. Whether or not a fibrous material is used within for thermal insulation, this construction renders the insulation system fully opaque. As pointed out previously, most chilled water systems have failed because there is usually no visible evidence in the initial stages of failure. This would certainly have been the case with any of these insulation jackets. However, a partially transparent or translucent low temperature piping system would visibly show any failure of the insulation system by the internal accumulation of condensation. Moreover, with a modular removable and reusable system, the area of failure could be opened up, drained and resealed, thereby reusing the insulation system components.

ASHRAE (American Society of Heating, Refrigeration and Air Conditioning Engineers) has recognized the special problems associated with insulating cold piping and is proposing a revision of its chapter on "Moisture in Building Construction" in its latest edition of "Fundementals"—the guidebook to the consulting engineering community. ASHRAE states that the moisture inevitably accumulates in permeable type insulation and, since "periodic replacement is the only known solution", the piping insulation should be accessible for such replacement and should have a means for draining water that would otherwise cause damage.

As discussed in ASHRAE and the trade literature, there is a pressing need for low cost highly impermeable insulation in chilled water piping distribution systems which provide immediate detection of system failure and can be easily removed, should that failure occur, and can be easily replaced and resealed after the condensation is removed.

The use of the air gap insulating jacket for hot and cold piping systems has been shown in the prior art, such as those systems described by Le Grand, Gronmeyer and Waldorf. However, in addition to their drawbacks of being fabricated of opaque sections, the inventors were unable to prove that an air gap system can compete commercially with fiberglass and foam insulations. In our previous application, Ser. No. 08/468,845, we discussed a testing program performed at the University of Maryland, Department of Mechanical Engineering. This program was carried out to prove that a plastic membrane jacket is superior to the current state of prior art and to develop and refine an environmentally benign (i.e., non-fibrous) air gap thermal insulation system.

As we discussed in our previous application, the primary purposes of the testing program were to determine the behavior of isolated volumes of air in terms of heat transfer resistance and to use the test results as a basis for developing air gap insulation devices which would be equivalent to existing, commercially available insulation products such as mineral fibers, synthetic foams and the like. Testing was conducted with fluid temperatures both well above and below ambient temperatures in order to determine differences in air gap behavior. These tests are discussed in more detail in Ser. No. 08/468,845.

Test apparatus were constructed with two of these apparatus providing the most useful and accurate results. The first apparatus consisted of parallel pipe sections of identical lengths each consisting of eight valves, with pipe sections between valves in each parallel length. The valves on one length were fitted with singular annulus prototype air gap jackets while those on the parallel length were insulated with fiberglass and vinyl covers in accordance with industry practice. The pipe sections between valves on each length were covered with foam insulation.

After preliminary testing to verify consistent, repeatable results, testing was initiated. Each test was run with fluid at a stable inlet temperature and with equal monitored flows to each parallel length. Comparison of stable outlet temperatures with inlet conditions provided results allowing comparison of relative insulating performance between a single air gap and commercial insulation. The results of this set of tests show that the single air gap prototypes were not as efficient as a standard thickness of fibrous insulation. However, as discussed below, additional air gaps increased efficiency dramatically.

In order to refine the comparison of relative performance, the parallel lengths were modified to consist of straight pipe lengths, so that varying sized radial air gaps installed on one length could be compared to varying thicknesses of commercial insulation installed on the other pipe length. However, prior to the commencement of this testing program, determination of the optimum air gap was made using a computer model. The heat transfer computer model of straight pipe geometry was formulated. Initially, heat transfer calculations were made assuming that radiation effects were not present. Optimum air gaps were calculated using heat transfer rates due to conduction and convection.

As the temperature difference between the pipe surface and the surroundings rises, the contribution to heat transfer from radiation becomes significant. Therefore, a radiation equation was included in the model to obtain a more precise model.

The air gap predictions, as obtained from the computer model, were compared to the experimentally obtained heat transfer rates for the straight pipes. The first group of tests involved the installation of one half inch thickness of foam insulation on one test leg and the fitting of acrylic jacket membranes insulation on the other test leg to create one or more air gaps or annuli. The radial air gap spacing was varied between test runs to determine behavior under different fluid temperature conditions. The results of this series of tests are displayed in FIG. 22 and table 2 in Ser. No. 08/468,845 and show that the performance of two, one quarter inch air gaps performed roughly equal to the same overall radial thickness of foam insulation.

The next set of tests were conducted on the second apparatus, a test apparatus as shown and described in standard C-335 of the American Society for Testing and Materials (ASTM). The test results shown in FIG. 23 of Ser. No. 08/468,845 indicate results similar to the previous test in that a series of concentric annuli can be used to provide insulating performance equal to, or even exceeding, the same thickness of fibrous insulation. The computed range of optimum air gap thicknesses is 0.25 inches to 0.50 inches. However, at low temperature differentials between the pipe surface and the surroundings, an air gap of larger than 0.50 inches can be effective.

Although no heat transfer tests on straight pipe sections carrying chilled water were conducted in the University of Maryland program, extrapolation of the graphs shown in FIG. 23 to lower differential temperatures shows a convergence of the results. At a differential temperature of 50 F. (ambient temperature of 95 F. minus pipe surface temperature of 45 F.), heat transfer results are similar, particularly between those of the two gap and three gap systems.

At the conclusion of the University program, another more sophisticated test chamber was built and further tests conducted at our own facility. The purpose of the additional tests was to observe the performance of one, two and three air gap systems using straight pipe sections carrying chilled water at temperatures of 42 F. with varying controlled ambient temperatures and humidity conditions. The idea was not to obtain heat transfer data with these tests but to observe:

1. The efficiency of the sealing and latching system in preventing moisture intrusion within the air gaps.
2. The efficiency of the system in preventing moisture from condensing on the outer surface of the covers.

The test rig consisted of a 4" diameter pipe section, three foot long, with 4" elbows on each end. The single walled prototype covers were installed on each elbow and on the pipe section with their seals installed between the fitting and pipe covers. Chilled water at 42 F. was pumped through the test rig and the chamber temperature and relative humidity increased to 90 F. and 90%, respectively.

Once the seals were properly installed, no moisture was observed within the single gap air space for both pipe and elbows after a period of four days, proving the functionality of the sealing system. However, moisture condensed on the outside surfaces of the elbow and pipe covers.

A MYLAR™ shell was then installed around the pipe section to produce another one quarter inch air gap. The pipe jacket now consisted of a dual wall system with two ¼" air gaps within. At extreme conditions (90 F. temperature, 90% humidity), only a line of moisture beads were observed along the base of the cover after these conditions were maintained for four days.

Another MYLAR™ shell was then installed on the pipe cover to produce a triple wall with each air gap being of one quarter inch thickness. Under the same ambient conditions as described above, no moisture condensed anywhere on the surface of the cover.

SUMMARY OF THE INVENTION

The object of the invention is to provide an insulating jacket of thermoplastic for fittings and straight pipe sections in a chilled water system which can seal the fittings and pipe sections off from the surrounding ambient environment thereby providing an effective vapor barrier to prevent the migration of moisture to the fitting and pipe section's cold surface or on the surface of the insulation.

It is also the object of this invention to provide an insulating fitting and pipe section jacket of thermoplastic in a chilled water system which is designed to utilize one or more air gaps, one of which is trapped between the fitting and pipe jacket's first wall and the fitting or pipe to provide effective insulation as determined in the recent University of Maryland research program.

It is also the object of this invention to provide an insulating fitting and pipe section jacket in a chilled water system which is at least partially made of clear, transparent or translucent, thermoplastic to permit observation of the fitting and pipe section and thus determine possible system failure.

It is also an object of this invention to provide an insulating fitting and pipe section jacket in a chilled water system which can be easily removed once failure is observed, the moisture drained, and the fitting and pipe section jacket easily reinstalled and resealed, all without the use of tools, or with a minimum number of tools.

To this end, an insulating jacket for a fitting in a chilled water system, has been provided which includes identical thermoplastic sections which snap together through the utilization of integral latches and resilient seals such as, but not limited to, neoprene rubber located along the longitudinal jacket interfaces. Additionally, split gaskets and tape have been provided to form a seal between each side of the fitting jacket and the adjacent pipe section insulating jackets described in this application.

Alternatively, an insulating jacket for a pipe section in a chilled water system, has been provided which includes a one piece thermoplastic jacket and includes a living hinge along its longitudinal length to permit the jacket to be opened along an opposing longitudinal joint for easy installation around the pipe section. The jacket is then snapped into place through the utilization of an elastomer seal and a snap-and-lock mechanism that runs along the jacket's longitudinal interfaces. Split gaskets and tape, as described above, are used to form a seal between the ends of each section.

In practice this design concept could be applied to all kinds of pipe fittings in a chilled water system or other hot or cold fluid distribution systems. Also, as discussed previously, additional air gaps could be built into the fitting and pipe jacket wall to increase thermal efficiency and one or more of these air gaps could be evacuated to provide even more thermal efficiency. In the hot fluid distribution system, there would be an overpressure prevention device that may be a hole or other type of pressure relief mechanism.

Also in practice, this design concept could be used as a means to prevent pipe, valves and fittings from freezing, either with or without heat tracing.

A most significant object is to conserve energy in an efficient and cost effective manner.

Another significant object is to utilize low permeability, clear, transparent, recycled or virgin thermoplastics to mold all the necessary insulating jacket components.

As referenced in patent application Ser. No. 08/468,845 Nicholson et al, reviewed and expanded upon herein, the theory and application of the air gap insulation is described First, the physical material creating the air gap or gaps contributes little or nothing in insulating value. The insulating capability of the air gap insulation is produced by the air trapped within the walls as well as the boundary layers where the air contacts the surfaces of the physical material creating the air gap. The boundary layers offer substantial thermal resistance in this insulation system. Each boundary layer's thermal resistance is dependent on many factors, including but not limited to, temperature differential, and the dimensions of the air gap. Therefore, in general, the more air gaps, the more boundary layers, the greater the thermal resistance of the insulation system. Thus one, two, three or more air gaps can be constructed to produce the desired amount of thermal resistance.

Secondly, there is a range of an optimum air gap thickness of approximately 0.25 inches to 0.5 inches. However, at low temperature differentials between the pipe surface and the surroundings, an air gap of larger than 0.50 inches can be effective. It is desired to have the air gaps at a minimum thickness to reduce heat loss caused by convection currents and to reduce material usage to a minimum. It is also desired to maximize air gap thickness to reduce heat loss caused by conduction. The optimum thickness is somewhere in between. This optimum air gap dimension must also be large enough so that the boundary layers, located at the wall surfaces, do not overlap. The thicknesses of the boundary layers vary with temperature differential. Therefore, an optimum air gap is one that yields the maximum benefits at a minimum of cost over the widest range of application parameters.

It has been experimentally demonstrated in the test chamber that under severe humidity and temperature conditions (R.H.=80% and temperature=90 F.), a three air gap system having a total thickness of ~1 inch and operating in an environment having a temperature differential between ambient and chilled water of ~55 F., prevented condensation from forming on the exterior of the triple walled pipe insulation jacket. Since the various walls of the insulation jacket assembly must maintain their relative spacing to each other and the pipe surface, one way to accomplish this is to provide legs, ribs, posts, or some other physical pieces that support and maintain the desired dimensional relationship of the various walls. Attention to minimize thermal conduction needs to be taken into consideration in the physical pieces that maintain the desired dimensional relationship of the various walls. One preferred embodiment of the numerous ways to accomplish this is to stagger the supporting physical pieces between the various walls, thus minimizing the thermal conductive paths. On the other hand, this minimizes the externally applied load carrying capacity of the insulation jacket assembly, and may not be the optimum configuration when external load carrying capacity is a desired feature. Thus an optimum between maximizing external load carrying capacity and minimizing thermal conductance to obtain maximum thermal resistance of the insulating jacket assembly would have to be determined.

The air gap or gaps required to produce the insulation is obtained by layers, or jackets, of thin plastic material surrounding the pipe or pipe fitting. The material that creates these air gaps in the preferred embodiment would be inexpensive, readily available, and possessing desired physical properties. The desired physical properties may include, but not be limited to, temperature resistance, strength, transparency or translucency, chemical resistance, UV resistance and ease of forming. Considering the above listed desired physical properties, currently a wide variety of plastic type materials are available that meet these requirements.

Considering the use of plastic materials for the preferred embodiment, several forming methods are available: these include, but are not limited to, injection molding, extrusion and vacuforming. The injection molding process offers several different variations that may provide economic advantages to the forming of the insulation system components. Some of these methods include open-shut molding, 2 shot molding, molding with an insert, and co-molding. The extrusion process has several variations including a single extrusion, co-extrusion of different materials of one part, and co-extrusion of more than one part. The vacuforming process may also be employed with its variations to produce insulation system components and/or subcomponents. Other methods and/or combinations of manufacturing methods may be employed to create the desired shapes and features to produce physical barriers that produce the required or preferred number of boundary layers, thus creating the intended pipe insulation product.

The injection molding process has distinct advantages where the pipe insulation system components are not of uniform cross section along the length of the component, such as: elbows and any other pipe fitting or component. The extrusion process offers advantages where pipe line insulation system components are of uniform cross section over the length of the component. Vacuforming is closer to injection molding than to extrusion but does not produce physical details that can be obtained by the other processes. However, vacuforming is the least expensive of the three methods and may offer advantages in producing interior layers of the pipe line insulation system components where physical detail and part tolerances are not as critical.

The preferred embodiment of the herein described invention would be constructed from a material that is transparent and/or translucent, to enable one to observe the physical condition of the insulated piping system elements and to also observe the presence of either the intrusion of condensation, intrusion of ambient liquid such as rain or washdown fluids and leaking fluid being transported by the piping system.

Another embodiment of the invention would be constructed from materials which would include a transparent and/or translucent strip along the base of the elbow and pipe jackets but be opaque otherwise. This would be useful when the elbow and pipe jackets must be installed on systems located outdoors where infrared radiation from sunlight impinging the transparent/translucent cover would otherwise affect the temperature of the fluid being carried by the pipe.

In another embodiment, the segments of the pipe line system components may be color coded to identify the type of service. For example, the plastic could be extruded or molded in various colors, or the live hinge on the pipe jacket assembly could be of various colors, or a color coded tape or other material could be added.

In another embodiment, internal liquid, from whatever source, is allowed to migrate within the internal layers and to accumulate at the inner surface of the lower outer layer where the accumulated liquid may be physically observed to allow remedial action to be taken. Migration of any moisture could be accomplished by allowing clearance at the point where the inner layers meet the end seals or by providing a hole in each of the inner layers. In this embodiment only the outer wall of the insulating system need be transparent or translucent, although a separate opaque outer insulation jacket may be added to a jacket that has a transparent or translucent section and the opaque section removed to check for accumulated liquid.

In another embodiment, longitudinal isolated segments of the pipe line insulation system are created in order to limit liquid from migrating along the pipe line system from its source. Other embodiments may allow leakage between some of the sections so that only one section of multiple sections needs to be transparent or translucent to detect the presence of a liquid in the multiple sections. When using only one transparent or translucent section, in multiple sections, a path between the sections for leakage can be formed by making multiple holes in the gaskets which divide the sections or by omitting the gaskets in some of the sections. By omitting the gaskets in some of the sections, the time required for installation can be decreased. Also, the number of transparent or translucent sections is reduced. In this embodiment only tape between sections would be necessary.

BRIEF DESCRIPTION OF THE DRAWINGS

The invention will be better understood when viewed with the following drawings wherein:

FIG. 8 is a vertical section substantially along the line 8—8 of FIG. 5 in the direction of the arrows thereon.

FIG. 9 is a vertical section substantially along the line 9—9 of FIG. 5 in the direction of the arrows thereon.

FIG. 10 is a vertical section substantially along the line 10—10 of FIG. 5 in the direction of the arrows thereon.

DETAILED DESCRIPTION OF PREFERRED EMBODIMENT

Figure 1:
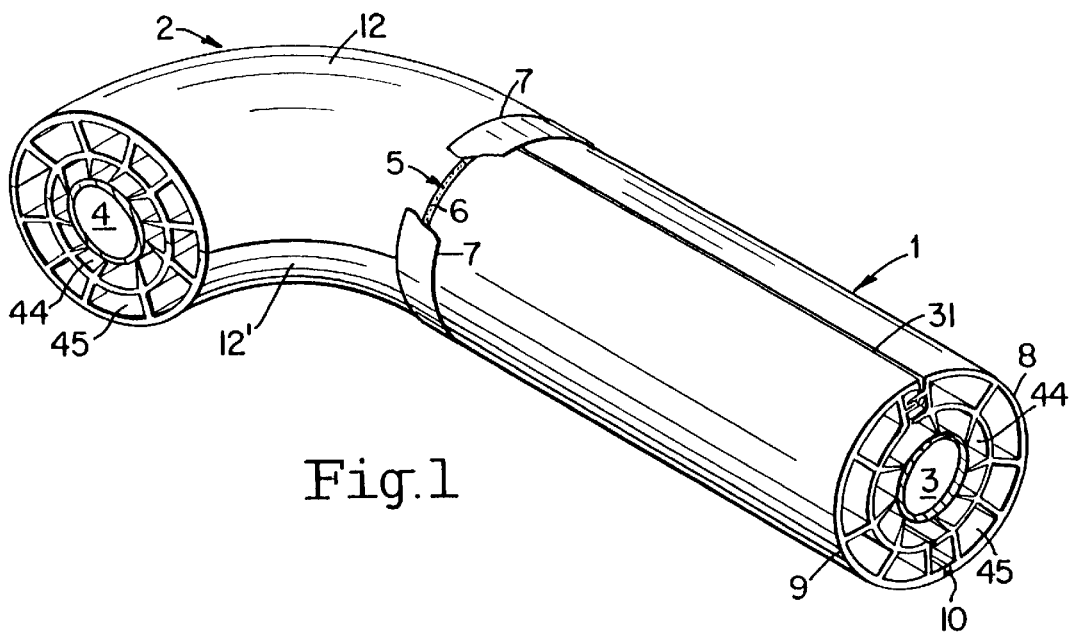
FIG. 1 is a perspective view showing a pipe jacket as assembly a abutting an elbow jacket installed on a pipe segment and elbow.

Referring now to the drawings wherein the reference numerals denote like elements throughout the several views, and prime numerals denote an identical part in a different orientation. FIG. 1 illustrates an installed pipe jacket assembly 1 segment or section abutting an elbow jacket assembly 2 as installed on a pipe segment 3 and an adjoining pipe elbow 4. At the junction of the pipe jacket assembly 1 and the elbow jacket assembly 2 is an insulation jacket joint 5 that consists of a split gasket 6 and sealing tape 7. FIG. 1 shows that the insulation jacket system on pipe segment 3 and adjoining pipe elbow 4 is shown as being comprised of separate pieces: the pipe jacket assembly 1 being one piece; the elbow jacket assembly 2 being formed from two identical elbow jacket halves 12 and 12'; and the insulation jacket joint 5 being formed by a split gasket 6 and sealing tape 7. The pipe jacket assembly 1 is comprised of the following components: the right pipe jacket half 8, the left pipe jacket half 9, and the intergrally formed live pipe jacket hinge 10, the live hinge, in this case, being made of a different softer material. Both the pipe and elbow jacket assemblies can be made of any thermoplastic, but PVC is the preferred thermoplastic in a 0.05 inch wall thickness. Clear or translucent PVC is used where desired.

Figure 18:
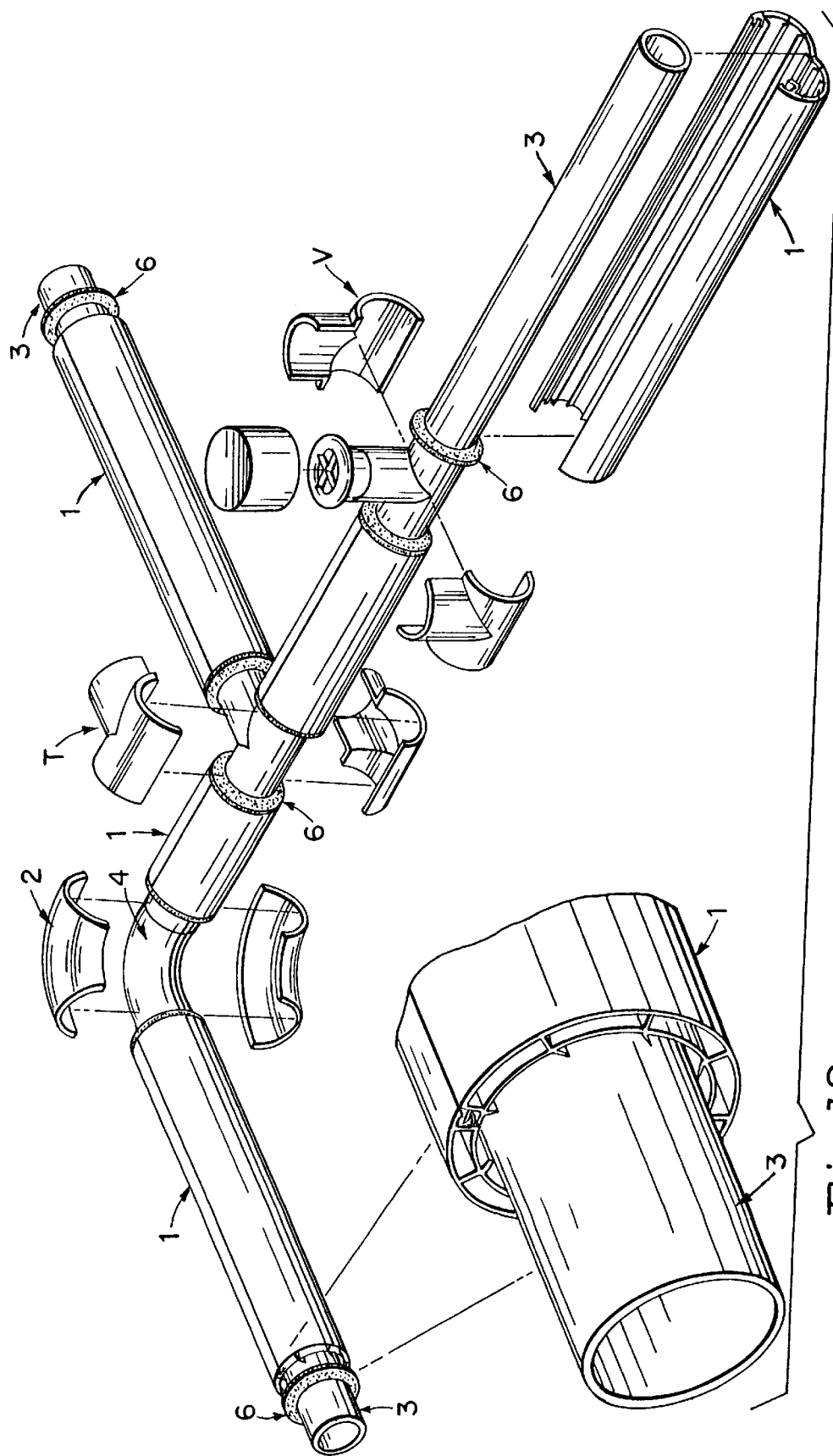
FIG. 18 is a perspective view of a multiple fitting piping system with some of the insulating jackets exploded.

Another embodiment of pipe jacket assembly 1 would be the extrusion of the assembly as a single piece with the two halves 8 and 9 being held together by a live hinge 10, the live hinge, in this case, being of the same material only thinner. The extrusion die should be in the form of a circle for even flow throughout the extrusion. As shown in FIG. 18, in addition to pipe 1 and 90 degree elbows 2, this preferred embodiment could also be used for insulating any other type and/or size of pipe and/or pipe fitting including, but not limited to, welded pipe, victaulic connected pipe, sweat jointed pipe, pipe made from any type of material including, but not limited to, metal, plastic, glass, fiberglass, or any combination thereof, valves V, 45 degree elbows, tees T, wyes, unions, reducers, caps, cleanouts, or any other pipe line components including, but not limited to, traps, strainers, pressure reducers, actuators, flanges, flow restrictors, metering devices, mixing devices, and other elements of known nature. From the following detailed description, the manner of adapting the invention to those other conditions will be readily apparent to those skilled in the art.

Figure 2:
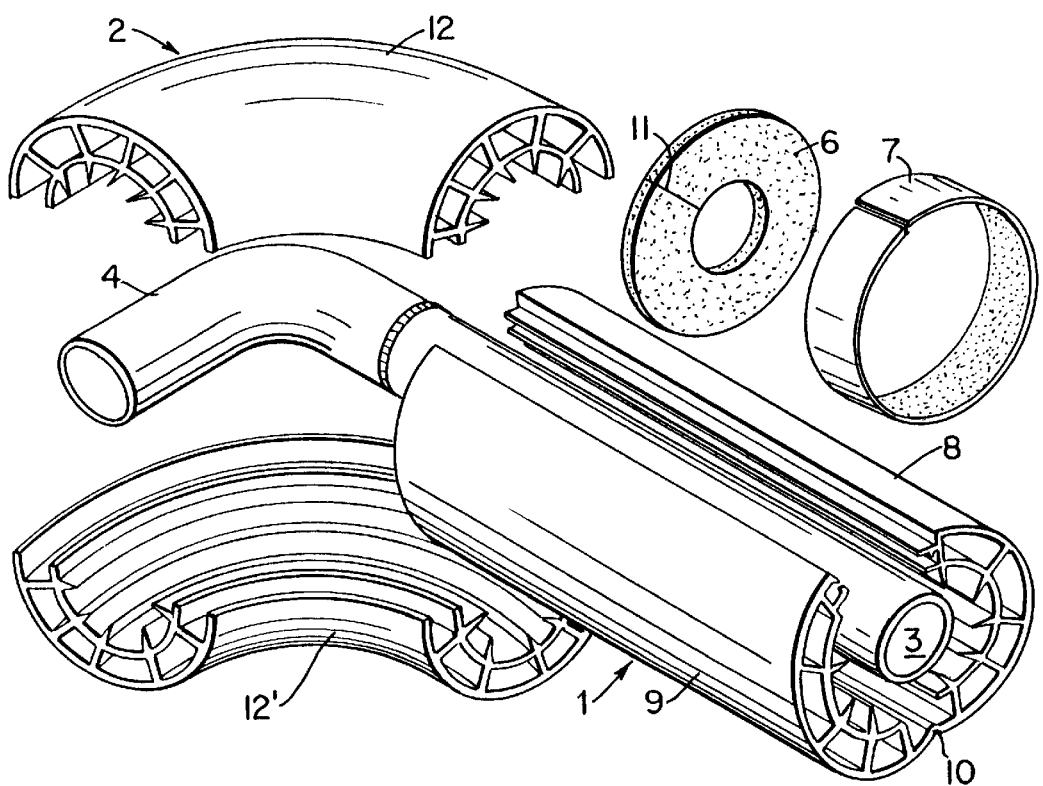
FIG. 2 is an exploded perspective view of FIG. 1 showing all of the various elements of the pipe jacket assembly, elbow jacket assembly, and insulating jacket joint.

FIG. 2 is an exploded perspective view of FIG. 1 showing the separate pieces of the insulating jacket system with the elbow jacket assembly 2 formed by halves 12 and 12' which are identical and have an integral fastener system and with the pipe jacket assembly 1 formed by halves 8, 9 and hinge 10. A split gasket 6 provides a seal between insulation jacket system assemblies. The split 11 of the gasket 6 provides a means to install the gasket 6 onto an existing piping system 3, and the sealing tape 7 provides the seal at the junction of the insulation jacket system assemblies.

In the preferred embodiment of the insulation jacket system assemblies, each has an integral seal that seals upon installing each assembly on each respective piping system component.

In another embodiment, the two identical elbow jacket halves 12 and 12' or the two elbow jacket halves each of a different configuration could be connected together by a feature like, but not limited to, a live hinge molded integral with the two parts, and extending longitudinally, rendering the identical elbow jacket halves 12 and 12' or the different configured elbow jacket halves as a single piece.

Another embodiment of the pipe jacket assembly 1 could be comprised of separate pieces, of either identical configuration or of different configuration. Another embodiment of the pipe jacket assembly 1 would be a single extruded piece, incorporating all the features of the pipe jacket assembly 1, including a split seal and/or an expansion joint.

Elbow Jacket Detailed Description

Figure 3:
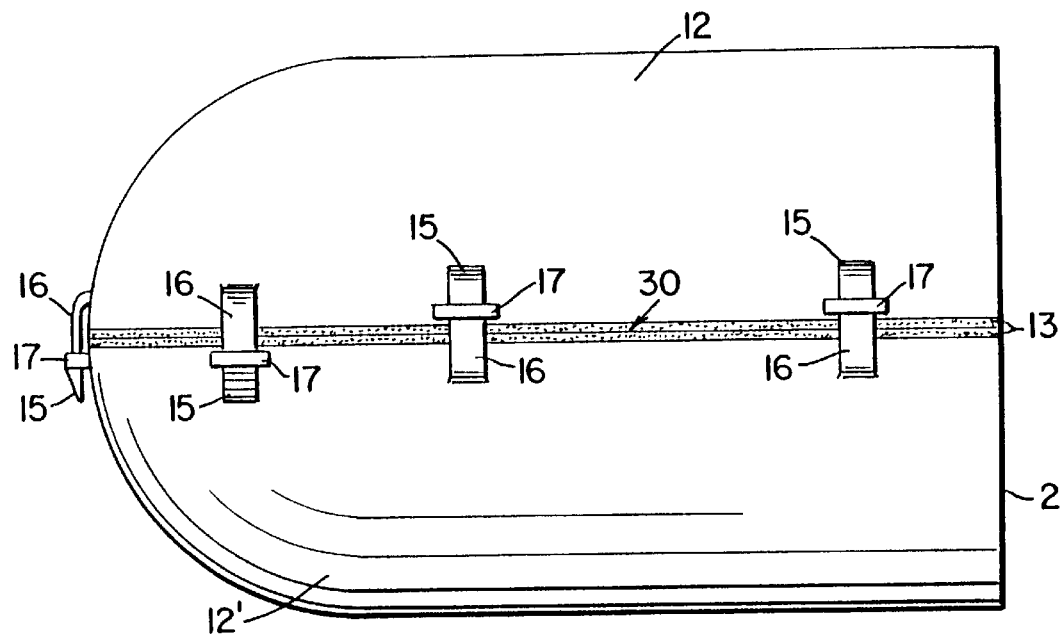
FIG. 3 is an exterior horizontal view of the relative position of two elbow jacket halves in the assembled position.

In a further description of the elbow jacket assembly, FIG. 3 illustrates an exterior horizontal view of the relative position of two identical elbow jacket halves 12 and 12' in the assembled position. Also shown in FIG. 3 is the mating of the elbow jacket seals 13 shown sealing together. In addition, FIG. 3 shows the engagement of the integral fastener system comprising tongues 15 and loops 17, fully engaged.

Figure 4:
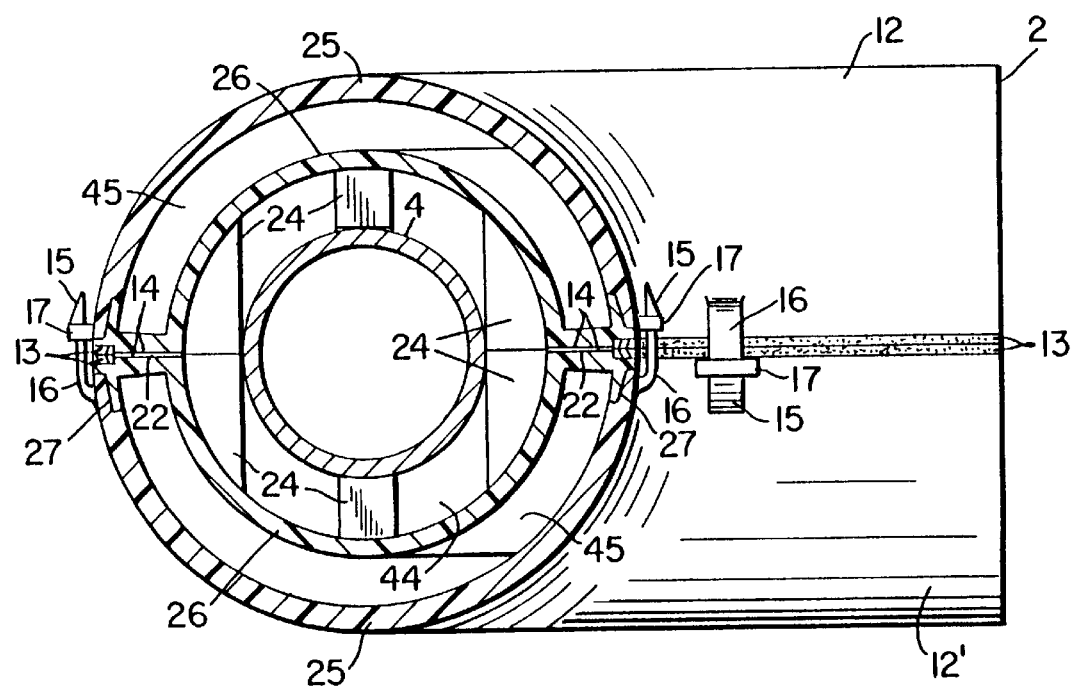
FIG. 4 is an end view of FIG. 3.

FIG. 4 shows the elbow jacket assembly 12 and 12' in an end view. The view clearly shows the relative orientation of the inner 26 and the outer 25 elbow jacket assembly walls that produced the insulating properties. In this embodiment of the invention, and in a more detailed view as shown in FIGS. 8, 9 and 10, the inner elbow jacket wall 26 is a separate injection molded piece from the outer elbow jacket wall 25 which is also a separate injection molded piece. The inner insulation jacket wall 26 provides the air gap 44 between the pipe elbow 4 and the inner wall and the outer insulation jacket wall 25 provides the air gap 45 between it and the inner jacket wall 26. Even though both elements of the invention are injection molded, one of various other manufacturing processes could be used to produce either or both of these elements. The inner wall 26 is firmly affixed to the outer wall 25 at interface 27 to form a single piece elbow half jacket 12. This can be accomplished by employing one or more of the following processes, but not limited to, glueing, pressfit, ultrasonic welding, hot and/or cold staking, or any of various other means, to hold the two elements 25 and 26 together. Also shown in FIG. 4 are the elbow standoffs or spacers 24 which are integral with the inner wall elbow jacket half jacket 26. Elbow standoffs 24 maintain the air gap 44 between the pipe elbow 4 and the inner wall 26 and can come into contact with the pipe elbow 4 to maintain the air gap. It is desired to minimize the contact of the standoffs 24 with the pipe elbow 4 in order to minimize thermal conduction. On the other hand, the standoffs 24 may need to be of sufficient strength to maximize load carrying capacity such as may arise from ladders to service personnel stepping on the elbow jacket assembly 2 or any other physical load that the elbow jacket assembly 2 may be subjected to. At the same time, the standoffs must be of a length which will permit the elbow jacket 2 to fit loosely around the pipe since the outside diameters of standard pipe sizes vary.

In FIG. 4, seals 13 are shown in cross-section sealing together. Again FIG. 4 shows the engagement of the integral fastener system comprising tongues 15 and loops 17 fully engaged on both inner and outer radii locations of the outer walls of elbow jacket assembly 2. The seal needs only to prevent vapor migration into the air spaces 44,45.

Figure 5:
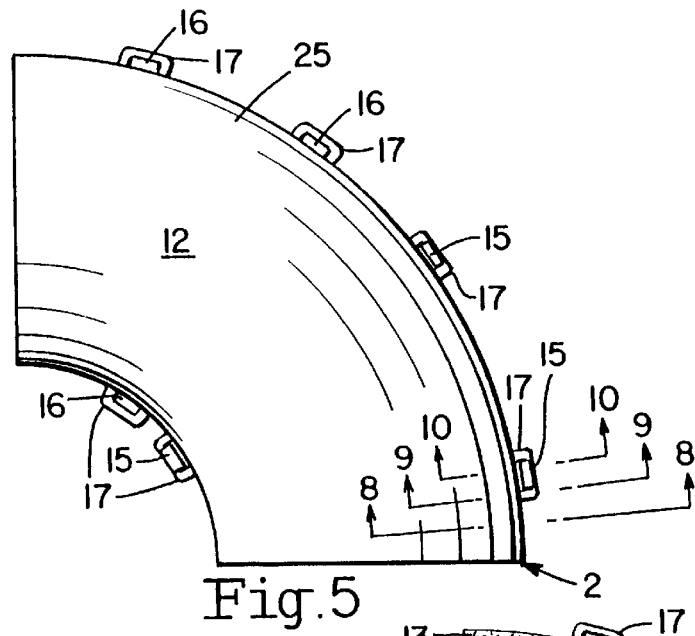
FIG. 5 is a top view of FIG. 3.

FIG. 5 shows the elbow jacket assembly 2 from an overhead view. FIG. 5 also shows the location of sections 8, 9 and 10 that are shown in the respective figures and further detail the construction of the integral latching system comprising tongues 15 and loops 17.

Figure 6:
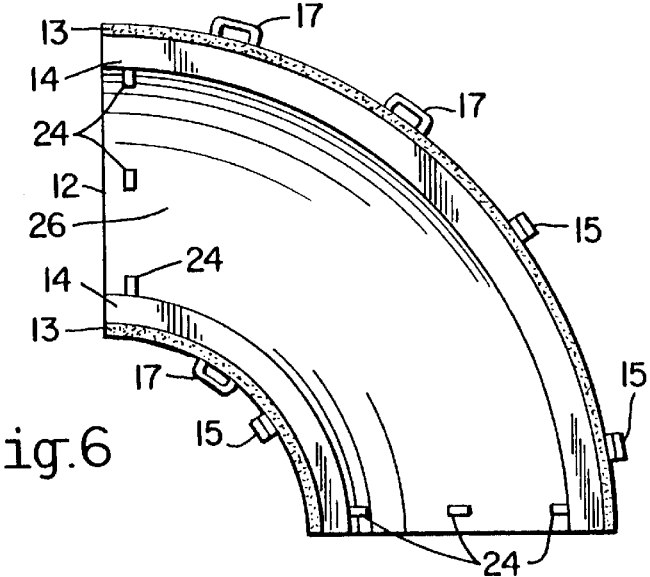
FIG. 6 is an interior horizontal view of FIG. 3.

FIG. 6 shows an interior horizontal view of an elbow jacket half 12 showing the nesting of inner wall 26 and the outer wall 25. A preferred location of elbow standoffs or spacers 24 are clearly shown. However, other orientations and locations and/or additional or fewer standoffs may be desirable. The physical shape and size of standoffs 24 may also vary.

Figure 7:
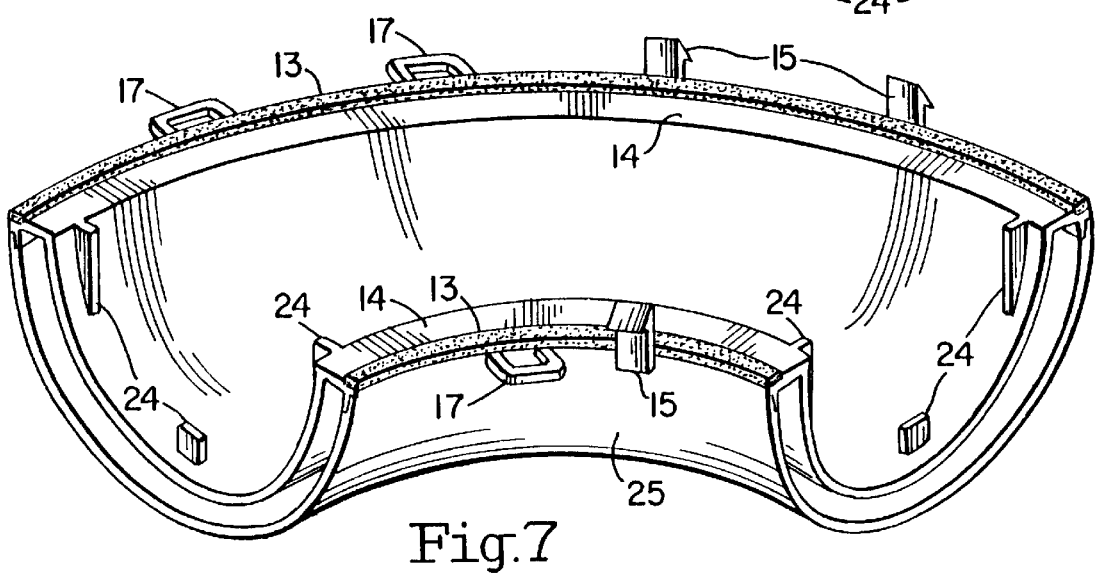
FIG. 7 is an orthographic interior view of FIG. 3.

FIG. 7 is an orthographic view of FIG. 6 showing the same features in a different orientation.

FIGS. 8, 9, and 10 are progressive sections taken from FIG. 5 through a latch assembly showing the relative relationships of the various latch assembly components such as tongue 15 and loop 17. The two elbow jacket halves 12 and 12', when fitted and pressed together around pipe elbow 4, are held together by the integral latching system formed by tongues 15 that slide into the hole formed by loop 17. As the elbow jacket halves 12 and 12' are pressed together, loop edge 21 engages tongue ramp 19 causing tongue stem 16 to deflect until the elbow jacket halves 12 and 12' have come together. The elbow jacket seals 13 then come into contact and deform so as to form a seal. An inner air gap 22 located at elbow jacket half abutting faces 14 permits compression of the seal 13 as tongue undercut 20 of tongue 15 progresses beyond latching surface 18 of loop 17. The seal 13 can be an elastomer glued in groove 30 and could be made of a material such as, but not limited to, Neoprene. In the latched position, undercut 20 abuts the loop latching surface 18 to provide the sealing deformation. Tongue 15 then returns to its unstressed position so that tongue stem 16 is no longer deflected. In this configuration, the elbow jacket halves 12 and 12' are restricted from separating due to the contact of tongue undercut 20 resting on latching surface 18 of the loop 17, thus providing a positive latch. The above described latching system configuration is only one of many possible configurations that can be constructed to accomplish the purpose of being integral with and holding the elbow jacket halves 12 and 12' together without any additional elements and also allowing the elbow jacket halves 12 and 12' to be separated without tools and reused.

In another embodiment of this invention, the elbow jacket seal 13 is manufactured with the elbow jacket half 12 during forming of the jacket and is made of a softer material than elbow jacket half 12 in order to provide deformation of the seal 13. An interference fit is thus produced with the mating elbow jacket half 12', thus creating a seal. Various processes may be used to provide the seal 13 such as co-molding, insert molding, post application of the seal material or of any various other means or configurations.

Continuing with the development of the construction of the pipe and elbow jacket assemblies 1, 2 installation, the insulation system will require the abutting of one pipe jacket assembly 1 to another pipe jacket assembly 1; a pipe jacket assembly 1 to an elbow jacket assembly 2; an elbow jacket assembly 2 to another elbow jacket assembly 2; or any other combination that may arise when insulating a piping system. The preferred embodiment of the jointing system of this invention utilizes a split gasket 6 installed at each joint. The outside diameter of the abutting insulation jacket assemblies 1 and/or 2 and the outside diameter of split gasket 6 are all of substantially the same dimensions, although these diameters may be larger or smaller to provide stress, or lack of stress, to the gasket as required. All three of these elements are brought into close and/or abutting proximity allowing sealing tape 7 to be applied circumferencially around the joint with sealing tape 7 spanning over all three diameters and sealing to all three elements, thus effecting a hermetic seal at the joint.

A preferred embodiment of the physical properties of split gasket 6 is that it be an impermeable, flexible, spongy material such as, but not limited to, vinyl nitrite. The purpose of split gasket 6 is to create isolated chambers to preclude the migration of moisture, or other fluids, within the insulation jacket system. Another purpose of split gasket 6 is to allow for axial movement of the pipe system and/or the insulating jacket system due to thermal or other expansion or contraction. For larger or smaller expansion or contraction, the width of gasket 6 can be varied to compensate for such expansion or contraction. Another purpose of split gasket 6 is to provide a seal at the termination of the insulation jacket assembly 1 or 2. Another embodiment of split gasket 6 is such that the abutting faces of the split 11 which allow split gasket 6 to be installed on an existing pipe, have an adhesive applied to the abutting faces 11 such that after installation around the pipe, the abutting faces are bonded together. However, the bonding together of split gasket 6 may be accomplished in a variety of other ways or methods, including the taping of the two ends of split gasket 6 together, after it is installed on the pipe, with a small piece of tape.

Pipe Jacket Detailed Description

Figure 11:
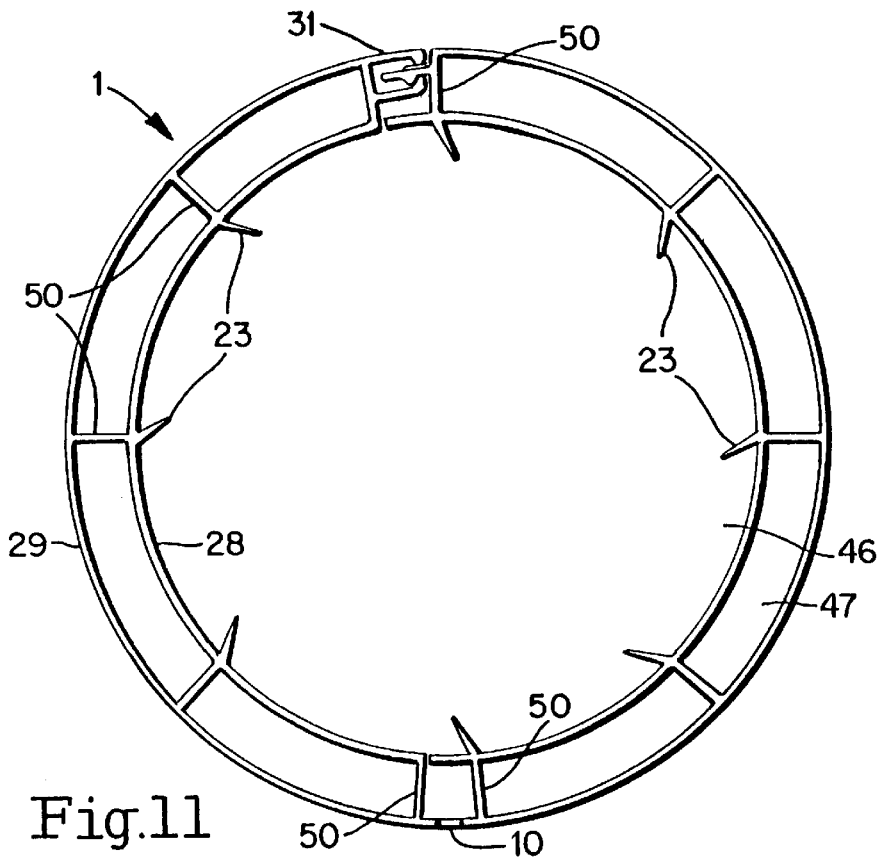
FIG. 11 is a vertical section of the pipe jacket assembly in the latched position.

Since the preferred embodiment of pipe jacket assembly 1 is an extrusion, FIG. 11 shows a cross section or end view of this assembly revealing all of its features. Since an extrusion process simultaneously generates all the desired features, various and/or multiple simultaneous and/or consecutive extrusion processes may be required to produce the preferred embodiment or any other embodiment of the invention. Again, with an extrusion process, the pipe jacket interior wall 28, pipe jacket outer wall 29, and pipe jacket standoffs 23, along with the latching means may be produced as a one piece pipe jacket assembly 1. As described herein before for the elbow jacket assembly 2, the same applies to the pipe jacket standoffs 23. Standoffs or spacers 23 are flexible and resilient enough not to break when they are bent fully over. They are made out of the 0.05 inch thick PVC of the jacket. As shown in FIG. 11, some of the standoffs 23 are radial extending and others are formed to be at an angle to the radius which may be 30 degrees as shown. The angled standoffs 23 allow the jacket to fit over pipe welds and other protrusions on the pipe. The angled standoffs 23 should also allow the jacket to fit snuggly on the tubes that are the same nominal size but differ somewhat in actual outer diameter. The radial standoffs or spacers can be used to provide less deflection of the jacket due to outside forces. The latch inside of projection 31 is shown enlarged in FIG. 13. The longitudinal extending continuous walls 50 provide the spacing for the outer air gap 47 as the standoffs do for the inner air gap 46. The live hinge 10 can be either a separate material or a thinned portion of the same material.

Figure 12:
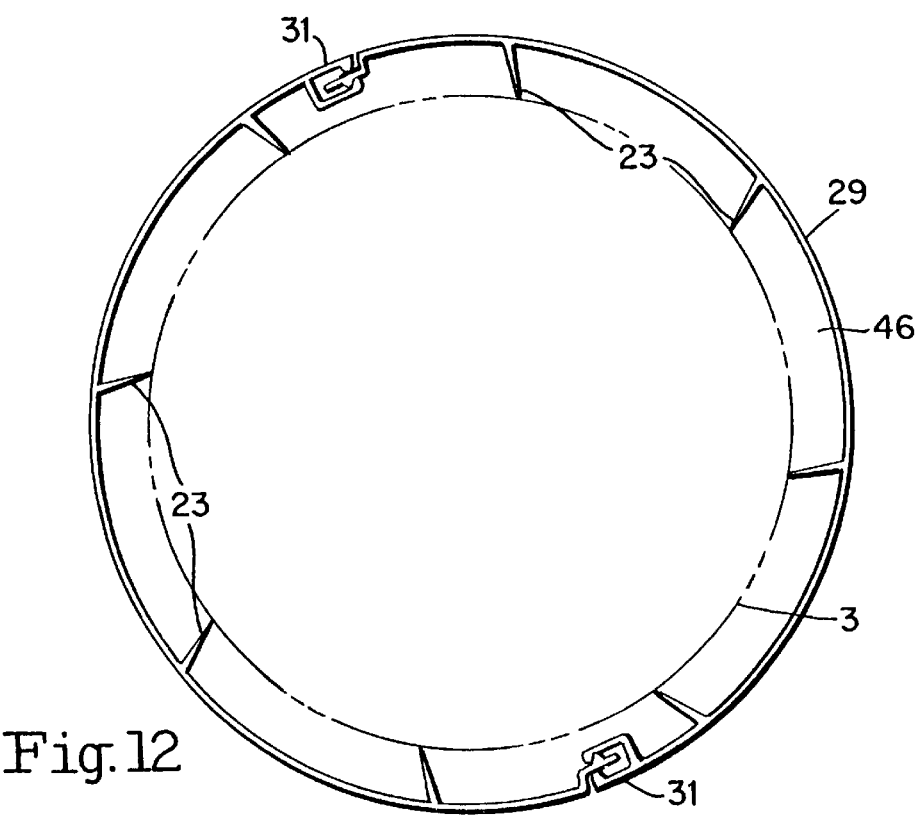
FIG. 12 is a vertical section of another embodiment of the pipe jacket assembly.

FIG. 12 shows a single walled jacket with the only wall being outer wall 29 creating a sole inner air gap 46. In this embodiment there is no hinge and the 2 halves are joined by two latches indicated inside of projection 31.

Figure 17:
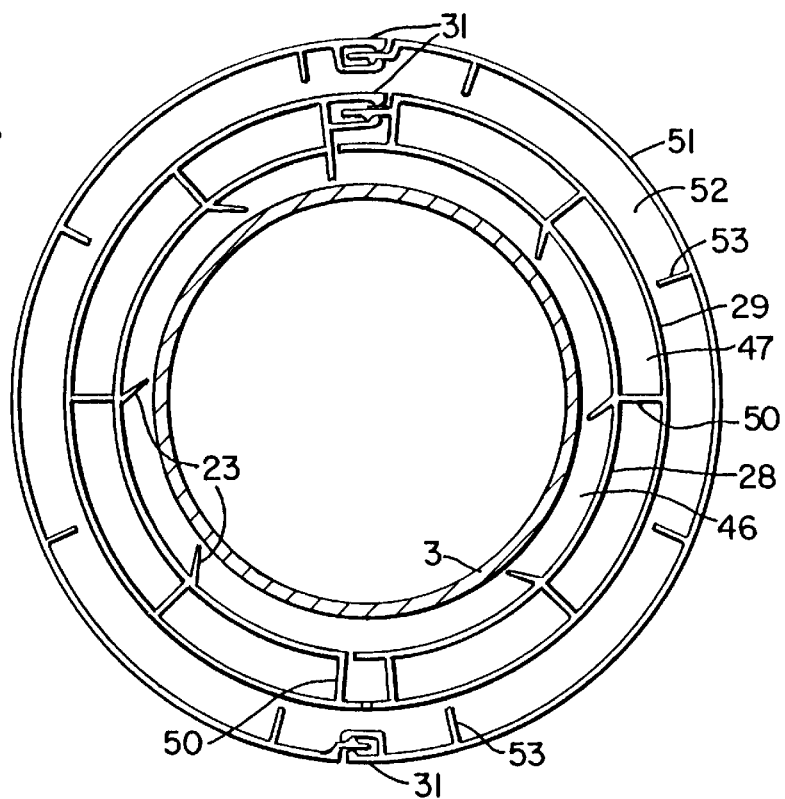
FIG. 17 is a vertical section of one form of a three air gap design.

Another preferred embodiment of the pipe jacket assembly 1 and elbow assembly 2 is the addition of one or more walls to these assemblies. This would be accomplished by attaching pipe and elbow assemblies, similar to pipe jacket assembly 1 and elbow jacket assembly 2, to the existing two air gap pipe and elbow jacket assemblies 1,2, thus providing one or two additional air gaps and making the total number of air gaps three, as shown in FIG. 17, or four, not shown, respectively. These additional assemblies would be installed over the two gap insulating pipe and elbow insulating jackets in a manner similar to that in which the two gap assemblies were installed on the pipe and elbow sections. Thus, a four gap assembly can be built by taking two of the jackets of FIG. 11 with one of the jackets being for a larger size of pipe. The double walled jacket for the pipe diameter to be insulated is installed, then the jacket for a larger diameter pipe is installed over the first or lower jacket. A three gap assembly can be built by installing a double walled jacket first and then installing the single walled jacket for a larger diameter pipe over the installed double jacket. It may be desireable to place the single walled jacket on the pipe first and then install the double walled jacket on top of the single walled cover. The use of a jacket that would fit a larger pipe diameter as an add-on jacket to increase the insulation of the pipe system is very desireable since it would decrease the number of molds needed to manufacture a complete product line and the amount of inventory required by the manufacturer, the distributor, or the installer. However, a specially designed add-on jacket may be desireable in some applications. Also, the jackets of FIGS. 11 and 12 can be used to make five or six air gaps, if needed. Since only the outer wall of the jacket needs to be sealed from the ambient, the inner wall or walls of the jacket can be separate pieces that would not have seals but would have standoffs to space them from other pieces and the pipe. These pieces could be extruded as shown in FIGS. 11 and 12 and would not have seals and/or latches. The design of FIG. 17 could alternatively have a hinge to replace one latch. Also, with the design shown in FIG. 17, split gaskets 6 could be installed at the end junctions of the pipe jacket assemblies or sections 1 thus creating the space 52 between the second and third walls 29,51 when the pipe jacket assembly 1 is not under an external load. In the unloaded position, the spacers 53 are spaced from the wall 29 and thus have no heat transfer contact with the wall 29. However, if the size of the outer jacket formed by wall 51 permits, some or all of the spacers 53 can make contact at all times with the wall 29. Or, if no split gaskets are used at the ends, some or all of the spacers 53 on the third wall 51 would come in contact with the second wall 29 to provide the spacing. In this case, the radial spacers 53 would also provide added support from any external load.

Figure 13:
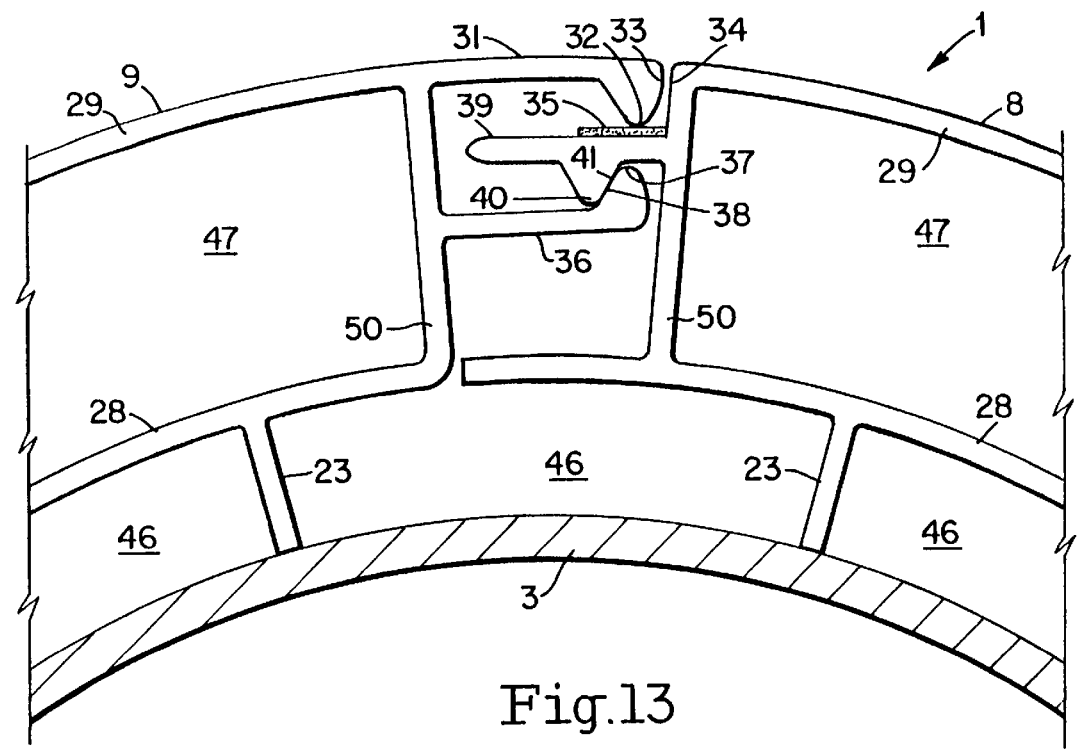
FIG. 13 is an enlarged end view of the latching means of the pipe jacket.

The latching means of pipe jacket assembly 1, as shown in FIG. 13, can be described as follows. The co-extruded integral live pipe jacket hinge 10 in FIG. 2 allows the right pipe jacket half 8 and the left half pipe jacket 9 to flex open enabling the pipe jacket assembly 1 to be easily installed around an existing pipe segment 3. Pipe jacket hinge 10 can be made of materials such as, but not limited to, ALCRYN™. The pipe jacket assembly 1 is latched and sealed by squeezing the 2 pipe jacket halves 8 and 9 together.

Examining the latching means in closer detail, as shown in FIG. 13, outer projection 31 and inner projection 36 are part of the left pipe jacket half 9, whereas intermediate projection 39 is part of the right jacket half 8. As the two pipe jacket halves 8 and 9 are squeezed together, intermediate projection 39 enters between the outer and inner projections 31 and 36. As the pipe jackets halves 8 and 9 progress together, outer projection peak 32 rides up on elastomeric sealing surface 35 as inner projection peak and intermediate projection peak approach each other. Progressing further, in closing pipe jacket halves 8 and 9, intermediate peak 40 and inner projection peak 37 pass over each other. As the projection peaks 37 and 40 were approaching each other, inner projection 36 experienced a major deflection while intermediate projection 39 experienced a minor deflection enabling the maximum width dimension of intermediate projection 39, which is at the location of the intermediate projection peak 40, to pass between outer projection peak 32 and inner projection 37. In the final latched position, inner projection 36 and intermediate projection 39 have returned to their undeflected state with inner projection abutting surface 38 contacting intermediate projection abutting surface 41, thus holding the pipe jacket halves 8 and 9 in the latched position. Simultaneously, outer projection abutting surface 33 abuts outer projection mating abutting surface 34 with outer projection peak 32 providing the longitudinal sealing by contact with elastomeric sealing surface 35. At this point, a strip of flexible polyethylene tape may be applied over the gap between 33 and 34 and along the longitudinal length of the jacket for extreme environmental conditions.

In order to remove pipe jacket assembly 1, first remove longitudinal tape (if required), then circumferencial tape 7 which seals split gasket 6 and jacket halves 8 and 9 (located at junction of pipe jacket and next pipe or fitting jacket). Remove the split jacket 6 and then insert fingers into air gap 47, and gently pull apart. Then continue to pry the two halves 8 and 9 apart from one end of the pipe jacket assembly to the other. The jacket would then be reassembled as previously described.

Figure 14:
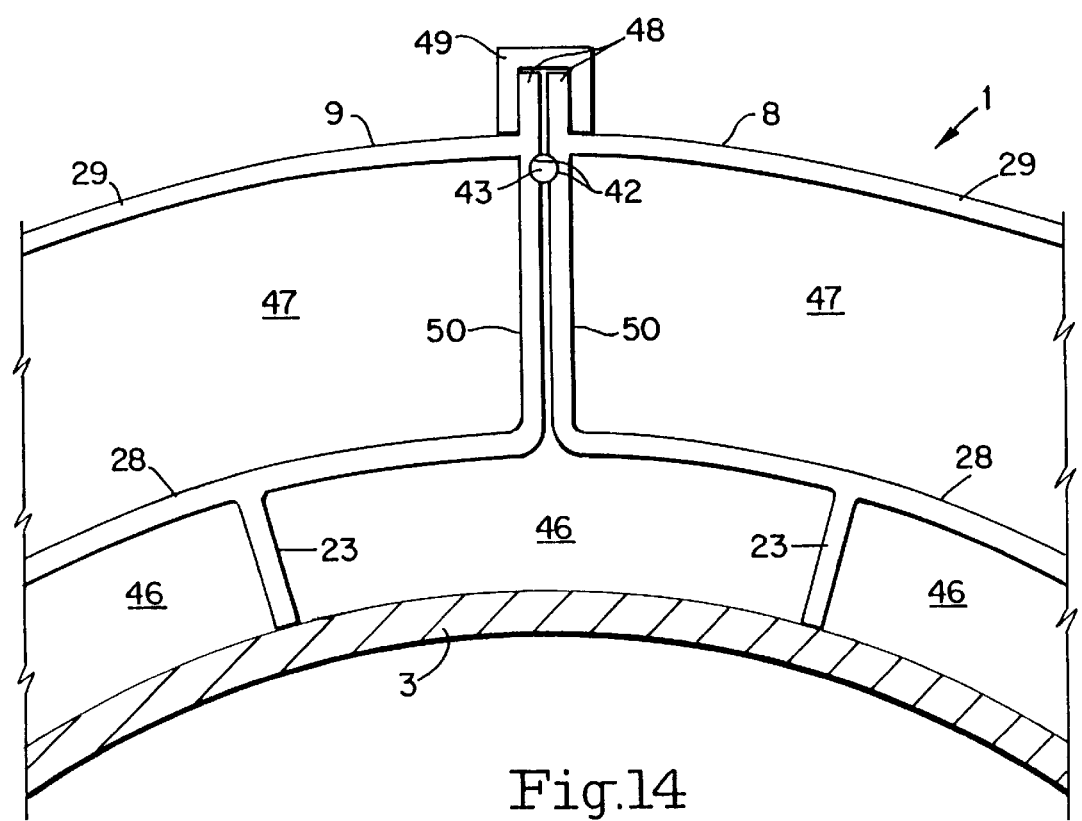
FIG. 14 is an enlarged end view of an alternate latching means of a pipe jacket assembly.

It is recognized and understood that the above described latching system configuration is only one of many possible configurations that can be constructed to accomplish the purpose of being integral with and holding the pipe jacket halves 8 and 9 together without any additional elements and without tools and also allowing the pipe jacket halves 8 and 9 to be separated without tools and then reused. Another method however, which could be used to hold pipe jacket halves 8 and 9 together would involve the use of external clips and/or fasteners. These clips or fasteners would not be an integral part of the cover. As shown in FIG. 14, clip or fastener 49 would enclose ridges 48 formed along the outer longitudinal edges of each jacket half 8 and 9, and hold the two halves together. A seal 43 which may be made of, but not limited to, neoprene is glued within the groove 42 on either half to provide the seal between the two halves or sections.

Figure 15:
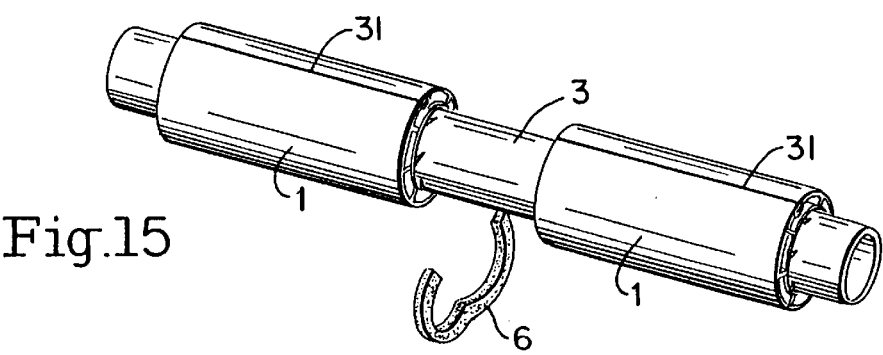
FIG. 15 is an exploded perspective view of two pipe jacket sections being joined with a split gasket seal (prior to sealing).

FIG. 15 shows the interconnection of two pipe jacket assemblies or sections 1 using foam split gasket 6 enclosing carrier pipe 3 at the junction of two pipe jacket assemblies 1. When insulating a hot piping section, the split gasket 6 could be removed since condensation in an isolated section indicating a seal failure in that section would not be applicable.

Figure 16:
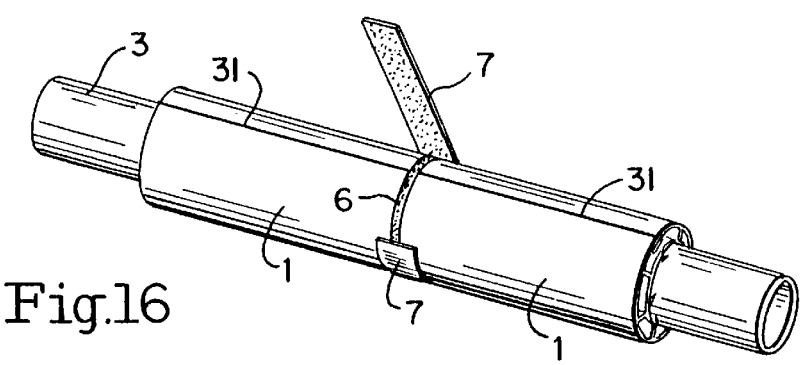
FIG. 16 is an exploded perspective view of two pipe jacket sections being joined with a split gasket seal (in process of sealing).

FIG. 16 shows the split jacket 6 installed between the two pipe jacket assemblies or sections 1 and the sealing tape 7 being applied over the two pipe jacket assembly edges and the split gasket— the tape coming in contact with all three surfaces to form the seal.

It may be desired that should thermal expansion of the pipe and/or jacket assembly occur, and the polyethylene tape and split gasket seal between the sections not be sufficiently flexible, a separate expansion joint element could be employed.

As stated above, a strip of polyethylene tape may be applied along the longitudinal length of the pipe jacket assembly 1 shown in FIG. 11 to cover the gap between abutting surfaces 33 and 34 to serve as an additional sealing mechanism in severe environmental conditions. Also, in addition to, or in lieu of, the use of tape, a flexible foam strip or cord having closed cells, an elastomer of O cross-section, or caulk or other seal material may be inserted within the gap between abutting surfaces 33 and 34 and running along the length of the pipe jacket assembly 1.

Another sealing mechanism would be the application of, but not limited to, a silicone caulking material, or flexible preformed material, added at the ends of the pipe jacket assembly 1 to seal the space between the inner and outer projections 31 and 36 to prevent moisture from entering the ends of the pipe jacket assembly when the system is used in severe environmental conditions.

In the preferred embodiment of the invention, the pipe jacket assemblies 1 are extruded in 3 foot sections, although they may be extruded in longer or shorter lengths. The 3 foot sections permit the pipe jacket assemblies to be more easily installed on the pipe, particularly from the top of a ladder. In this procedure, the installer can slide the rigid pipe jacket assemblies along the extent of the pipe, section by section, with each section being within his armspan.

It is further desired that certain additives and/or coatings be added to the extruded and molded pipeline system insulating elements for the following reasons:

1. To permit the materials to comply with industry specified smoke and burning tests.
2. To inhibit the effects of sunlight whose infrared and ultraviolet radiation can be detrimental to the materials and the effective performance of the system.
3. To provide reflective coatings which can reduce heat transfer due to radiation from the hot or cold pipe surfaces. For these applications, a coating may consist of transparent MYLAR™ film or liquids with which the elements may be coated to provide the reflective surfaces.

Another embodiment of the elbow and pipe jacket assembly latching means would be for each latching part to be manufactured as a separate section or element, separate from the elbow and pipe jacket, and then subsequently attached to the elbow and pipe jacket by a process such as, but not limited to, ultrasonic welding.

In another embodiment of the invention, the elbow and pipe jacket assemblies are manufactured with latches but no seal. The assemblies would then be sealed with a foam seal, caulk or tape, once the jacket assemblies are installed on the pipe.

In another embodiment of the invention, the elbow and pipe jacket assemblies are manufactured with no seals or latches. The assemblies could then be held together with wireties to replace latches and installed on the pipe. They could then be sealed with a foam seal, caulk or tape.

In another embodiment of this invention, the elbow and pipe jacket assemblies are formed with a seal but no latches. The assemblies could then be held together with wireties.

In another embodiment, the elbow and pipe jacket assemblies are formed with no seals and/or latches. The halves are sealed and fastened together by tape along the longitudinal joint and the joint between two adjacent assemblies. This is the most inexpensive embodiment to manufacture. The tape could be used to hold or fasten the jacket halves together and/or seal the halves. That is, tape could be applied to only hold the halves together or to only seal the halves. The tape could be applied circumferentially to the jacket ends to hold the jacket closed and caulk, foam or other sealant applied to seal the longitudinal joint.

In another embodiment requiring more labor to assemble, the jacket is built of multiple single wall sections, such as shown in FIG. 12. In this design, the wall can be flat and thinner or the same thickness (0.05 inch PVC) with thinned areas between at least some of the spacers 23 to allow the flat wall to be bent to encircle the pipe and to form a jacket. The flat sheets can be packed with spacers internested for shipping. Where multiple air gaps are needed, the flat sheets could be provided in different lengths for ease of assembly. If there are no latches or seals on the wall sections, the jackets are formed and sealed as previously described by the use of tape, ties or sealant.

What is claimed is:

1. A method of heat insulating an element of a hot or cold fluid distribution system comprising the following steps:

providing an insulation system formed by a thin plastic jacket material around the element, choosing the jacket material thickness such that the insulation value of the jacket material is insignificant relative to the overall insulation value of the insulation system, forming an air space around the element by the use of the plastic jacket and means within the jacket for abutting the element to allow for the formation and the maintenance of the air space between the jacket and the element, the air space forming substantially all the insulation value of the insulation system, omitting other kinds of solid insulation from the air space, providing a translucent portion in the jacket so that one of the elements, the interior portion of the jacket, or the interior wall of the jacket can be inspected without removing the jacket, providing at least one longitudinal joint along the length of the jacket for ease of installation, applying tape to the longitudinal joint of the jacket or circumferentially to the end of the jacket and providing a means to seal the longitudinal joint.

2. The method of claim 1 including the step of, providing the translucent portion by forming a portion of the jacket from translucent plastic.

3. The method of claim 2 including the step of, making the translucent portion of the jacket transparent.

4. The method of claim 1 including the step of, installing the jacket by using a fastening mechanism which is part of the jacket.

5. The method of claim 4 including the steps of, forming the fastening mechanism of the plastic material forming the jacket and forming the fastening mechanism during the fabrication of the jacket.

6. The method of claim 1 including the steps of, providing a seal carried by the jacket joint along the length of the jacket and the step of applying tape to the longitudinal joint of the jacket only applies tape to a portion of the joint.

7. The method of claim 1 including the step of, providing the means to seal the joint along the length of the jacket by the use of tape alone.

8. The method of claim 1 including the step of, applying the jacket to the straight run or a fitting of a hot or cold fluid distribution system.

9. The method of claim 8 including the steps of, providing the jacket around a valve in a fluid distribution system and providing a removable cover on the jacket for access to a handle of the valve.

10. The method of claim 9 including the step of, forming the cover from a stretchable material which allows installation by stretching over a portion of the jacket.

11. The method of claim 9 including the step of, forming the cover of a translucent material.

12. The method of claim 1 including the step of, forming plural air spaces within the air space between the jacket and the element by providing additional layers of thin jacket material to increase the insulation value of the insulation system.

13. The method of claim 1 including the step of, providing an overpressure prevention means on the jacket when the jacket is used on a hot fluid distribution system.

14. The method of claim 1 including the steps of, providing the jacket in sections along the length of the jacket and providing tape between sections of the jacket to seal one section to the next section.

15. The method of claim 1 including the steps of, providing the jacket in sections along the length of the jacket and providing an annular flexible foam gasket, having a split portion to the end of a section to at least partially seal one section from the next section.

16. The method of claim 1 including the step of, providing the means to seal the longitudinal joint by the use of tape alone.

17. The method of claim 1 including the step of, providing a seal carried by the jacket along the length of the jacket and applying tape circumferentially to the end of the jacket.

* * * * *